United States Patent [19]

Magyar

[11] Patent Number: 4,647,119
[45] Date of Patent: Mar. 3, 1987

[54] SUPPORT PLATE FOR THE COUPLING MEANS AND ELECTRICAL CONNECTIONS OF AN INSULATED SEMITRAILER CISTERN

[75] Inventor: Georges Magyar, Ruffey-les-Echirey, France

[73] Assignee: Magyar, Dijon, France

[21] Appl. No.: 778,785

[22] Filed: Sep. 23, 1985

[30] Foreign Application Priority Data

Sep. 28, 1984 [FR] France ................ 84 14986

[51] Int. Cl.⁴ ............................................ H01R 13/74
[52] U.S. Cl. ....................................... 339/10; 339/15
[58] Field of Search .............. 339/10, 15, 119 R, 123, 339/125 R; 280/421, 422; 307/9

[56] References Cited
U.S. PATENT DOCUMENTS

| | | | |
|---|---|---|---|
| 2,616,945 | 11/1952 | White | 174/52 R |
| 2,658,185 | 11/1953 | Hatcher, Sr. | 339/188 C |
| 3,229,109 | 1/1966 | Wilson | 307/9 |
| 3,420,546 | 1/1969 | Jasovsky | 280/421 |
| 3,497,707 | 2/1970 | Stewart | 307/9 |
| 3,602,869 | 8/1971 | Metz et al. | 339/15 |
| 3,628,811 | 12/1971 | Rivers | 280/421 |
| 3,641,472 | 2/1972 | Phillips, Jr. | 339/10 |
| 3,915,476 | 10/1975 | Burkle | 339/10 |
| 4,163,137 | 7/1979 | Close, Jr. | 339/123 |
| 4,394,027 | 7/1983 | Watkins, Jr. | 280/5 C |

Primary Examiner—John McQuade
Attorney, Agent, or Firm—McAulay, Fields, Fisher, Goldstein & Nissen

[57] ABSTRACT

Disclosed is a support plate for the coupling means and the electrical connections of an insulated semitrailer cistern which is fixed by its periphery on the edge of a window made in the bottom wall of the metallic jacket of the cistern. An annular joint seals the space between said plate and the edge of the window. The electrical conductors and the pneumatic channels of the cistern are protected in a flexible metallic element embedded in a layer of insulating material and are connected respectively through the window to the coupling means and the electrical connections.

11 Claims, 4 Drawing Figures

SUPPORT PLATE FOR THE COUPLING MEANS AND ELECTRICAL CONNECTIONS OF AN INSULATED SEMITRAILER CISTERN

It is known that a semitrailer cistern is equipped with signal lights and lights as well as a system of automatic braking which are controlled from the cab of the pulling vehicle.

Up to now, the respective connections between the electrical feed circuit and the pneumatic circuit of the pulling vehicle, on the one hand, and those of the semitrailer cistern, on the other hand, were made from a folded tin support or from a molded socket provided with coupling means and electrical outlets. This support was secured on the front of the bottom in the shape of a curved cap or on the extension of the coupling plate.

However, such a support blended poorly with the vehicle since it formed a non-aesthetic projecting mass. Moreover, because of its generally anti-aerodynamic shape, it had a poor ability to penetrate any air and therefore introduced a braking coefficient during movement of the vehicle. It will also be understood that its presence made more difficult the cleaning of the jacket protecting the bottom. Finally, such a support provided imperfect sealing for the electrical connections and a poor protection for the pneumatic channels.

The present invention has for its object to remedy the disadvantages of prior art and to this effect, provides a support for coupling means and for electric connections for semitrailer cisterns comprising a body and two bottoms in the shape of a curved cap, insulated by a thick coating of insulating material coated externally by a metallic jacket, which support comprises a plate provided with several coupling means and electrical connections and which is fixed by its periphery on the side of a window made in the bottom wall of the jacket, with an annular joint providing sealing between the plate and the side of the window and that the electrical conductors and pneumatic channels of the cistern are protected by a flexible metallic member embedded in the layer of insulating material and connecting through the window to the coupling means and to the electrical connections.

Advantageously, the jacket for protecting the front of the bottom is pushed back during manufacture in such a way as to form a cup-shaped portion projecting exteriorly and provided with a flat bottom having the same surface as the support plate and the window is made in the center of the bottom and provides a peripheral edge for the application of the support plate.

The support plate can be secured by any known means on the said flat bottom but preferably it will be fixed by means of several screws and bolts distributed uniformly about the periphery of the window.

It will be understood that once the plate is fixed, it forms with the lateral wall of the projecting part a surface which is practically uniform and without discontinuity. The annular joint ensures excellent sealing between the plate and the window and thus opposes itself to the introduction of any liquid or of any dirt which would interfere with good electrical contact. At the same time, the joint fills the space between the plate and the flat bottom of the projecting portion thus giving to the assembly a finished appearance. As a result, the cleaning of the front wall of the jacket is greatly facilitated.

One embodiment of the invention will be described now in detail with respect to the accompanying drawing in which.

Figure 1:
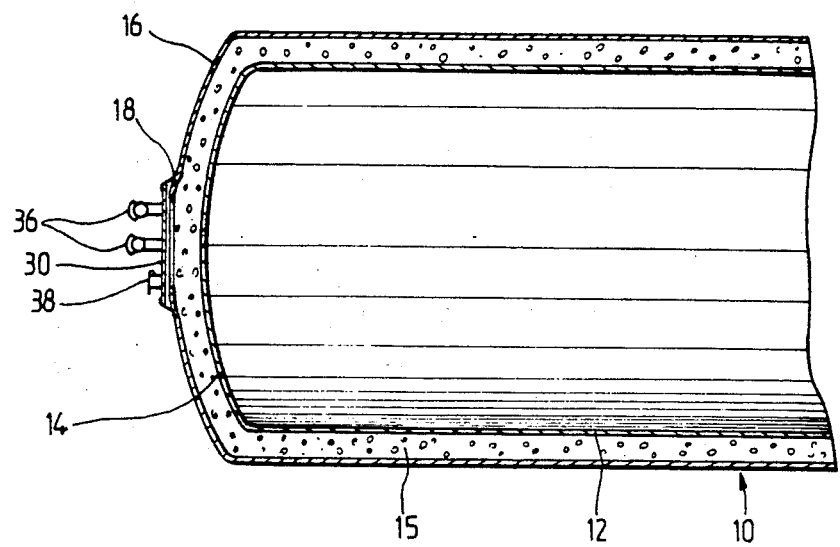
FIG. 1 is a partial longitudinal cross-sectional view of an insulated cistern provided on its front bottom with a support for coupling means and electrical connections according to the invention.

Tank 10 shown in FIG. 1 comprises a generally cylindrical body 12 closed at its extremities by bottom walls in the shape of curved or arcuate caps with only the front bottom wall 14 being shown on FIG. 1. The body and the bottoms are insulated by a thick layer of insulating material 15 which is covered on the outside by a metallic jacket 16 which protects mechanically the insulating material as well as gives to the tank an aesthetic brilliant appearance.

The jacket which covers the front bottom 14 is pushed back in its central part in such a way as to cause a portion 18 which is cup-shaped to appear and which has a substantially truncated lateral wall 20 having the same axis as the longitudinal axis of the tank and which is connected to a circular flat bottom 22 which is orthogonal to said axis. When the jacket is of plastic material, the projecting part 18 is made by molding. The said flat bottom is pierced centrally by window 24 and conforms therefore to a peripheral edge which surrounds said window. Wall 20 also is connected to the wall of the jacket by an annular portion 26 which has a small curvature.

On the said flat bottom 22 is applied with the interposition of an annular joint 28, a circular support plate 30 which has a diameter substantially equal to the external diameter of bottom 22.

Figure 4:
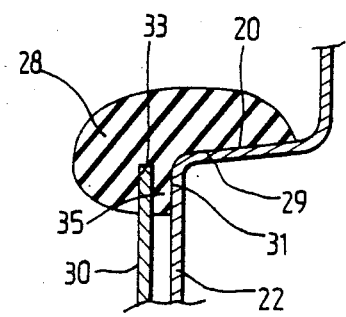
FIG. 4 shows on a larger scale a detail of FIG. 2.
Figure 2:
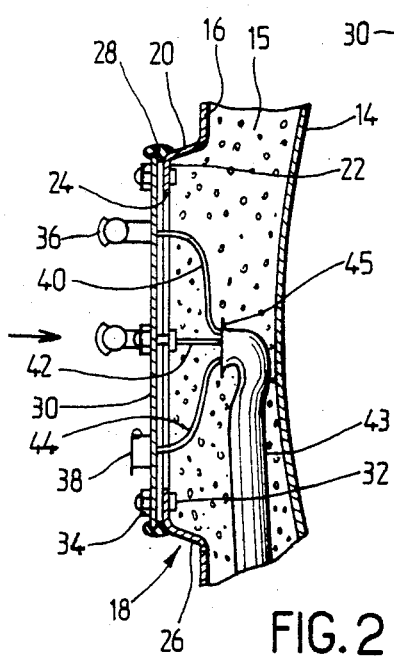
FIG. 2 is a view on a larger scale of a detail of FIG. 1.

As shown by FIG. 4, the joint has a hollow annular profile 29 which espouses tightly the truncated wall 20 and the flat bottom 22. At a short distance from wall 31 through which the profile 29 is applied on the flat bottom, a groove 33 is formed which has walls parallel to wall 31 and in which fits the periphery of support plate 30.

Thus, support plate 30 is slightly spaced away from flat bottom 22 by the rib 35 which is defined between groove 33 and wall 31 of the joint. It is maintained in this position by means of several screws 32 and bolts 34 uniformly distributed around the periphery of the plate as shown in FIG. 3.

Figure 3:
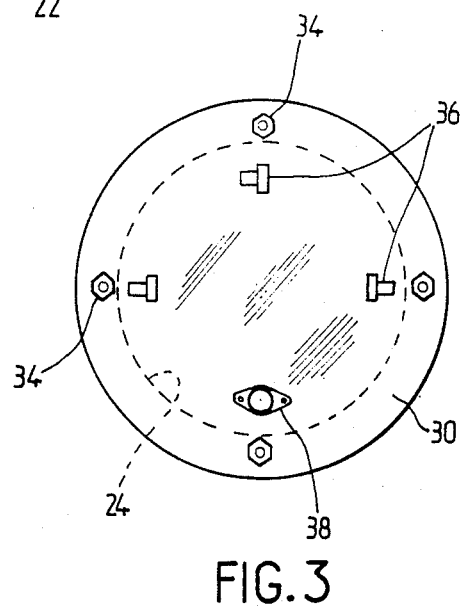
FIG. 3 is an elevational view of the support, in the direction of the arrow of FIG. 2.

Support plate 30 has a plurality of coupling means 36 and electrical connections 38 (respectively three and one in number on FIG. 3). To said coupling means and electrical connections are connected respectively from the inner surface of the plate and through window 24, the pneumatic channels 40, 42 and the electrical conductor 44 of the semitrailer cistern. The latter are protected by a flexible metallic element 43 embedded in the thickness of the layer of insulating material of the tank. The flexible element near support plate in a collar 45 which is externally flared in order not to damage the channels and the conductor.

The plate 30 forms with the lateral wall 20 and with the surface of jacket 16 a regular surface which is easy to clean. Joint 28 gives proper sealing and opposes itself to any introduction of foreign bodies through window 24 toward the electrical connections and the pneumatic connections as well as toward the insulating material. The pneumatic channels and the conductors are perfectly protected by the flexible element 43 and by the insulating material against shocks and external pressures.

I claim:

1. A support for the coupling means and the electrical connections of a semitrailer cistern which comprises a body and two curved bottoms insulated by a layer of insulating material and covered by an outer metallic jacket, which support comprises a plate, a plurality of coupling means and of electrical connections on said plate;

a window in the bottom wall of said jacket, said plate being secured by its periphery along the edges of said window, a sealing joint between said plate and said edges of said window, a flexible metallic member embedded in said layer of insulating material, electrical conductors and pneumatic channels fitting in said metallic member and being connected respectively through said window to said coupling means and electrical connections on said support plate.

2. A support according to claim 1, wherein said jacket has an outwardly cup-shaped projection, said projection having a substantially truncated lateral wall and a flat bottom section having a similar surface as that of said support plate, said bottom section having therein said window and a peripheral edge about said window to apply said support plate.

3. A support according to claim 2, wherein said support plate is secured to said flat bottom by means of several screws and bolts spaced uniformly about the periphery of said window.

4. A support according to claim 2, wherein said joint has a hollow annular profile adapted to espouse the shape of said truncated wall and said flat bottom and a groove for engaging the periphery of said support plate.

5. A support according to claim 4, including screws and cooperating bolts spaced uniformly about the periphery of said window for securing said support plate to said flat bottom.

6. A support according to claim 1, wherein said metallic jacket includes a truncated lateral wall portion along the same axis as the longitudinal axis of said cistern, said truncated wall portion being connected with said bottom wall.

7. A support according to claim 1, wherein said flexible metallic member is externally flared.

8. A support according to claim 6, wherein said flexible metallic member is externally flared.

9. A support according to claim 1, wherein said joint includes a groove for receiving said support plate and a rib between said bottom wall and said support plate for spacing thereof from said bottom wall.

10. A support according to claim 9, wherein said groove is defined by a pair of spaced walls and a wall of said joint on which said bottom wall is juxtaposed thereon.

11. A support according to claim 6, wherein said joint includes a groove for receiving said support plate and a rib between said bottom wall and said support plate for spacing thereof from said bottom wall.

* * * * *